US006627149B1

(12) United States Patent
Tayama et al.

(10) Patent No.: US 6,627,149 B1
(45) Date of Patent: Sep. 30, 2003

(54) HIGH-PURITY SILVER WIRES FOR USE IN RECORDING, ACOUSTIC OR IMAGE TRANSMISSION APPLICATIONS

(75) Inventors: Kishio Tayama, Hachioji (JP); Takashi Ohgami, Tokyo (JP); Hiroshi Miura, Yokohama (JP)

(73) Assignee: Dowa Mining Co., Ltd., Tokyo (JP)

( * ) Notice: Subject to any disclaimer, the term of this patent is extended or adjusted under 35 U.S.C. 154(b) by 0 days.

(21) Appl. No.: 09/229,786

(22) Filed: Jan. 11, 1999

Related U.S. Application Data

(63) Continuation-in-part of application No. 08/814,112, filed on Mar. 10, 1997, now abandoned.

(30) Foreign Application Priority Data

Jun. 21, 1996 (JP) .............................................. 8-181362

(51) Int. Cl.[7] ................................................. C22C 5/06
(52) U.S. Cl. ........................ 420/501; 148/430; 428/606
(58) Field of Search ................................ 420/505, 501, 420/404; 148/505, 430, 404; 428/606, 364; 174/137 B

(56) References Cited

U.S. PATENT DOCUMENTS

| | | | |
|---|---|---|---|
| 3,165,396 A | | 1/1965 | Goon |
| 4,448,902 A | | 5/1984 | Coblenz et al. |
| 4,518,418 A | | 5/1985 | Fletcher et al. |
| 4,976,792 A | | 12/1990 | Sawada |
| 5,573,861 A | | 11/1996 | Takahashi et al. |
| 5,582,630 A | | 12/1996 | Lam et al. |
| 5,698,158 A | | 12/1997 | Lam et al. |
| 6,231,637 B1 | * | 5/2001 | Tayama et al. ............... 75/367 |
| 6,444,164 B2 | * | 9/2002 | Tayama et al. ............. 266/149 |

FOREIGN PATENT DOCUMENTS

| | | |
|---|---|---|
| JP | 56-169341 | 12/1981 |
| JP | 60-208434 | 10/1985 |
| JP | 60-224720 | 11/1985 |
| JP | 61-163504 | 7/1986 |
| JP | 61-163505 | 7/1986 |
| JP | 63-105908 | 5/1988 |
| JP | 06-225891 | 8/1994 |
| JP | 06-279992 | 10/1994 |
| JP | 9-256083 A | 9/1997 |
| JP | 10-8165 A | 1/1998 |
| JP | 10-8244 A | 1/1998 |
| JP | 10-158753 A | 6/1998 |
| JP | 10-158754 A | 6/1998 |
| JP | 10-324930 A | 12/1998 |

OTHER PUBLICATIONS

Complete English language translation of: Yoshio, Obara, Scramble Report on New Product Ultimate World of SPU Cartridge Was Viewed, Rajio Gijutsu, (1997) vol. 51, No. 3, pp. 92–93 (copy of this translation previuosly faxed to applicant).*
English language abstract only of: Yoshio, Obara, Scramble Report on New Product Ultimate World of SPU Cartridge Was Viewed, Rajio Gijutsu, (1997) vol. 51, No. 3, pp. 92–93.*
E.M. Savitski, *Handbook of Precious Metals*, p. 529, (1989).

* cited by examiner

*Primary Examiner*—John Sheehan
(74) *Attorney, Agent, or Firm*—Frishauf, Holtz, Goodman & Chick, P.C.

(57) ABSTRACT

A high purity silver wire for use in recording, acoustic or image transmission applications. The high purity silver wire is made of high purity silver containing sulfur, iron, copper, palladium, gold and lead impurities in an amount such that no one of the sulfur, iron, copper, palladium, gold and lead impurities individually exceeds 0.5 ppmw, and wherein all other impurities are present in a total amount of less than 1 ppmw.

8 Claims, 1 Drawing Sheet

HIGH-PURITY SILVER WIRES FOR USE IN RECORDING, ACOUSTIC OR IMAGE TRANSMISSION APPLICATIONS

This application is a continuation-in-part application of application Ser. No. 08/814,112, filed Mar. 10, 1997 (now abandoned).

BACKGROUND OF THE INVENTION

1. Field of the Invention

This invention relates to silver wires for use in video display apparatus such as VTR or TV or in audio equipment.

2. Background Information

Conductors conventionally used in recording, acoustic or image transmission applications are made of annealed copper wires, which are produced by cold working oxygen-free or tough pitch copper with a purity of about 99.9 wt % followed by annealing, or copper wires prepared by plating such annealed copper wires.

With copper wires having purities on the order of 99.9 wt %, signals cannot be transmitted correctly without phase differences and, as a result, only blurred images or unsharp sounds are produced. To solve these problems, high-purity copper wires produced by working raw materials having purities of at least 99.999 wt % have recently been introduced into the market.

Similar effects are exhibited by silver wires that are produced by a process which comprises solidifying silver with a purity of at least 99.95 wt % in a longitudinal direction to yield an ingot, drawing it by either cold or warm working and further working the wire under conditions that will not cause recrystallization. This process is described in Unexamined Published Japanese Patent Application No.163505/1986 under the title of "A Process for Producing Conductors for Use in Video Display Apparatus or Audio Equipment", which is a priority application of Sawada U.S. Pat. No. 4,976,792. However, the demand of the market has solely been for copper wires.

Thus, in the metal purifying technology, 6N and 7N copper materials have successfully been developed (purities of at least 99.9999 wt % are designated herein as "6N" and purities of at least 99.99999 wt % are designated herein as "7N"). On the other hand, practically feasible methods of purifying silver materials were not heretofore developed and silver wires of such high purity have not heretofore been produced that can be tested for their performance to thereby obtain data that compare with high-purity copper wires.

High purity metals prescribed in the Japan Industrial Standard (JIS) are limited to metals with a purity of 99.99% (4N) or less. As regards metals with a purity of more than 99.99%, the grading is made by the manufacturers of the respective metals on their own terms. Accordingly, if a metal with a purity of 99.999% (5N) or a metal with a purity of 99.9999% (6N) is available from a certain manufacturer, the nominal purity is a purity that has been evaluated by the manufacturer itself based on the technical level of analysis of that manufacturer.

The specification of a silver bullion with a purity of 99.9% (3N) and one with a purity of 99.99% (4N) are given in JIS H 2141 (1964). The particulars of the silver ingot compositions set forth on page 346 of JIS H 2141 are as set forth hereinbelow.

| | Chemical composition (%) | | | | | |
|---|---|---|---|---|---|---|
| | | Impurities | | | | |
| Classes | Ag | Pb | Bi | Cu | Fe | Remarks |
| Silver ingot, Class 1 | 99.99 Min | 0.001 Max | 0.001 Max | 0.003 Max | 0.002 Max | Mainly for sensitive material |
| Silver ingot, Class 2 | 99.95 Min | 0.005 Max | 0.005 Max | 0.030 Max | 0.003 Max | For other general industrial use |

Silver contents specified in the above Table are denoted by subtracting the sum total of impurities in the above Table from 100 and contain a microquantity of oxygen or such.

Other than referring to JIS H 1181-Methods for Chemical Analysis of Silver Ingot and JIS H 1183-Method for Spectro Chemical Analysis of Silver Ingot, there is no other mention on page 346 of JIS H2141 as to what kind of analytical technique is to be used. There is also no mention on page 346 of JIS H 2141 as to whether the "%" is wt % or atom %. It is considered, however, that "%" means "wt %" on page 346 of JIS H 2141.

High purity silver was described in a catalogue dated Jan. 15, 1994 from Johnson Matthey Company of Spokane, Wash., a world-famous manufacturer of high purity metals. The Johnson Matthey Company sells a variety of high purity metals in a relatively small amount. The Jan. 15, 1994 Johnson Matthey catalogue provided the following typical analysis (ppmw) for a grade of silver:

| Element | |
|---|---|
| Al | <0.1 |
| Ca | <0.1 |
| Cu | <0.1 |
| Fe | 0.2 |
| Mg | <0.1 |
| Pb | <0.1 |
| Si | 0.1 |

Based on the above analysis, it may therefore have been possible to obtain high purity silver with a purity that some may have considered to be of "99.9999% or more" by making use of a "zone-melting process", or the like. However, the meaning of "99.9999% (6N)" in conjunction with the Jan. 15, 1994 Johnson Matthey catalogue is not the same as the term "99.9999% (6N)" with respect to the present invention.

In the case of the Jan. 15, 1994 Johnson Matthey catalogue, the designated impurities are limited to elements inclusive of Al, Ca, Cu, Fe, Mg, Pb and Si. It is stated in the Johnson Matthey catalogue that the typical analysis is by emission spectroscopy, and that glow discharge mass spectroscopy (GDMS) is available on a lot by lot basis on special request. It is also stated in the Johnson Matthey catalogue that the numerical values of the impurities are given in terms of ppmw. Thus the accuracy of the typical analysis set forth in the Jan. 15, 1994 Johnson Matthey catalogue cannot be fully determined.

In the "Handbook of Precious Metals", p. 529 (1989), the footnote at the bottom of Table A.4 described a Ag content of 99.9999% and more.

It is not known what kinds of elements were analyzed as impurities in silver with a Ag content 99.9999% or more as described in the footnote to said Table A.4. Assuming that the same elements as set forth in the Table A.4 are analyzed as the designated impurities in the silver with a Ag content 99.9999% or more (Table A.4 lists the following impurities: Au, Pt, Pd, Fe, Pb, Bi, Sb, Te and Zn), such impurities are not the same as all the elements which were analyzed as designated impurities in the 6N—Ag of the present application. Also, there is no mention in the "Handbook of Precious Metals" as to which method was used for the analysis of impurities in silver.

SUMMARY OF THE INVENTION

An object, therefore, of the invention is to establish a process for producing high-purity silver materials by novel means and thereafter work them into wires, thereby providing high-purity silver wires suitable for use in recording, acoustic or image transmission applications.

The present inventors conducted intensive studies with a view to attaining the stated object and found that by using a special vacuum distillation refiner, high-purity silver with a purity of at least 99.9999 wt % could be obtained that had a total impurity content of less than 1 ppmw as measured by glow discharge mass spectrometric analysis. When high-purity silver wires drawn from this raw material were assembled into video display apparatus or audio equipment, there could be produced images or sounds that were sharper than those obtained with the conventional high-purity copper wires. The present invention has been accomplished on the basis of this finding.

Thus, the stated object of the invention can be attained by a high-purity silver wire for use in recording, acoustic or image transmission applications, which contains sulfur, iron, copper, palladium, gold and lead in such amounts that none of them will exceed 0.5 ppmw (ppm wt.) as they are taken individually and wherein any other impurities that can be measured in an amount not less than the respective lower limits of detection add up to less than 1 ppmw.

The present invention also provides a high purity silver wire for use in recording, acoustic or image transmission applications, wherein the high purity silver wire consists of silver having a purity of not less than 99.9999 wt % that is determined by subtracting a total amount of the contents of specified impurities given in wt % from the numeral 100 given in wt %, and wherein only the measurements exceeding the detection limits of the respective elements are added to obtain said total amount, the specified impurities consisting of the predetermined twelve elements inclusive of Na, Si, S, K, Ca, Cr, Fe, Ni, Cu, Pd, Pb and Au, the contents of the respective elements being determined by glow discharge mass spectrography whose detection limit for Au is 0.1 ppmw and whose detection limit for each of the other eleven elements is 0.01 ppmw.

DETAILED DESCRIPTION OF THE INVENTION

Figure 1:
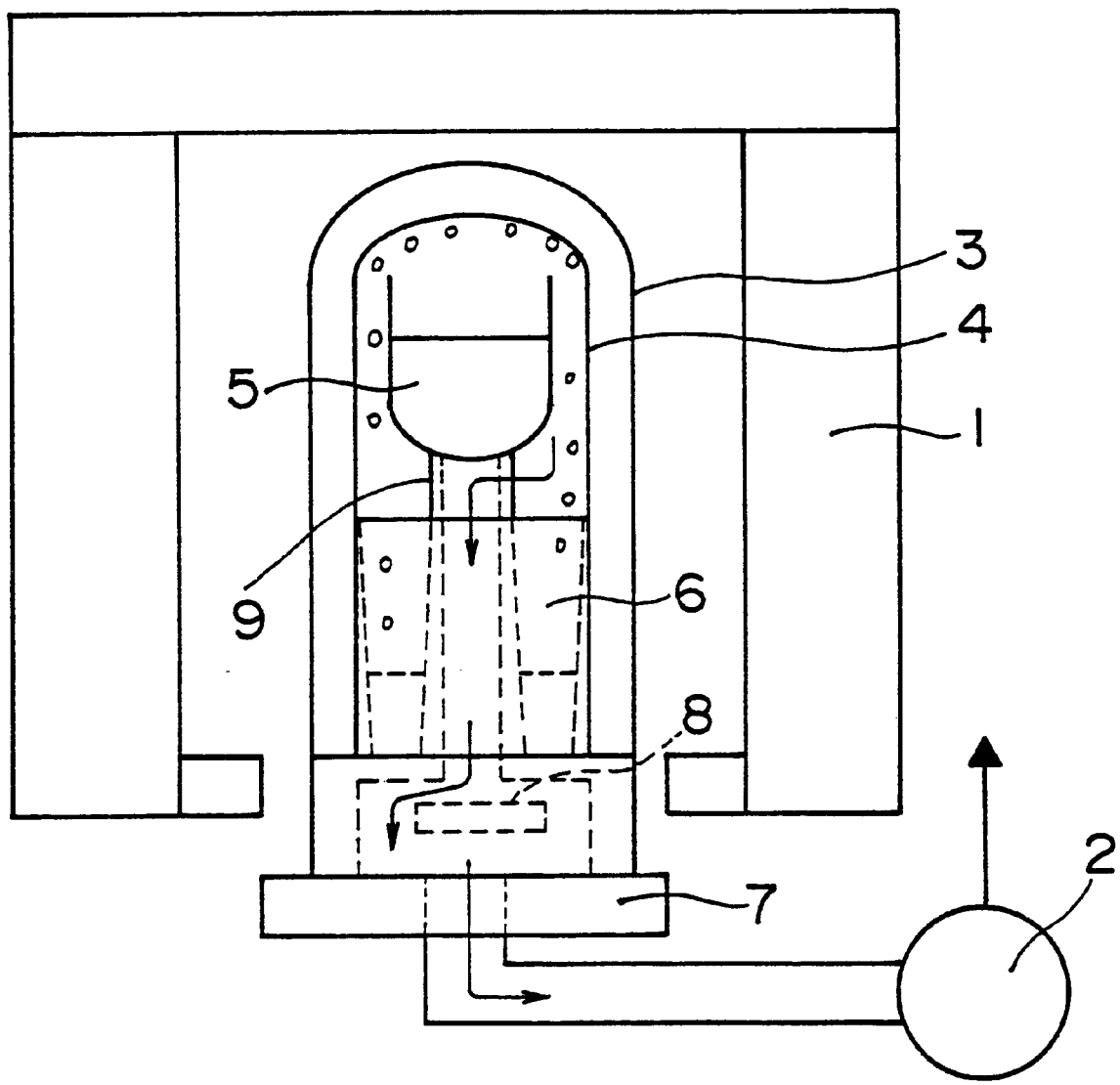
FIG. 1 is a vertical section showing schematically an apparatus for producing the high-purity silver of the present invention.

An exemplary apparatus for producing high-purity silver for use in the present invention is shown schematically in FIG. 1. An electric furnace 1 contains an outer quartz cylinder 3 which is adapted to be capable of being evacuated with a vacuum pump 2. The outer cylinder 3 contains a feed crucible 5, a recovery mold 6, a cooling trap 8 and a water-cooled flange 7 that are connected together in a detachable manner, and an inner quartz cylinder 4 is mounted over the feed crucible.

A suitable amount of silver feed (with a purity of about 99.99 wt %) is charged into the crucible 5 and heated in the electric furnace at a temperature of at least 1065° C., preferably between 1200 and 1350° C., with the degree of vacuum being controlled at 0.1 Pa or below, preferably 0.02 Pa or below; as a result, the silver feed in the crucible evaporates and condenses on the ceiling of the inner quartz cylinder to yield purified silver particles, which drop between the crucible 5 and the inner quartz cylinder 4 and thereafter fall into the recovery mold 6, which is connected to the bottom of the crucible.

While the silver feed contains various kinds of impurities, those which have lower vapor pressures than silver, such as gold, copper, palladium and iron will remain in the crucible 5, whereas those having higher vapor pressures such as sulfur, sodium, calcium and lead will not condense but remain in a gaseous form that is withdrawn by means of the vacuum pump 2 to be introduced into the cooling trap 8 via a suction hole in the bottom of the crucible; thereafter, those impurity gases are cooled to solidify by the action of the water-cooled flange 7.

In the present invention, the recovery mold already assumes the shape of the mold which is to be used in a step subsequent to the purifying process; hence, there is no need to recast the purified silver as in the prior art and less contaminated high-purity silver can be produced by a simple process having no distinction between purifying and casting stages.

Then, with the temperature in the recovery mold maintained at 1300° C., the silver is hot- and cold-worked into a wire (1.5 mm$^\emptyset$) under ordinary conditions. Analysis with a glow discharge mass spectrometer revealed that none of the sulfur, iron, copper, palladium, gold and lead contents was more than 0.5 ppmw, whereas other impurities such as sodium, silicon, potassium, calcium, chromium and nickel, of which the detection limits on the glow discharge mass spectrometer were each 0.1 ppmw and below, were present in a total amount of less than 1 ppmw.

The term "6N—Ag" or "silver with a purity of 99.9999% or more" used in the present specification is defined as follows.

(1) Elements Analyzed as Impurities:

The following twelve elements are analyzed as impurities in silver: Na, Si, S, K, Ca, Cr, Fe, Ni, Cu, Pd, Au and Pb.

(2) Methods for Analysis Used:

Glow discharge mass spectrography (GDMS) was used.

(3) Detection Limit:

The detection limit can be set for each of the elements to be detected independently.

For all the eleven elements excluding Au, 0.01 ppmw was set to be the detection limit by GDMS. For only Au, 0.1 ppmw was set to be the detection limit by GDMS. This is because the quantitative analysis of Au by GDMS is particularly difficult due to interference by tantalum (Ta) and oxygen (O), because tantalum exists as a constituent each of a sample holder, a discharge cell and a slit member of the GDMS apparatus, while oxygen enters the apparatus as a component of air which invades during the time of a sample exchange. For the reason given-above, it is practically difficult to set the detection limit for Au to be at lower than 0.1 ppmw.

(4) Determination of the Purity of Silver:

The silver content is determined by subtracting a total amount of the contents of the specified impurities given in wt % from the numeral 100 given in wt %, wherein only the measurements exceeding the detection limits of the respective elements are added to obtain said total amount, the specified impurities are the predetermined twelve elements inclusive of Na, Si, S, K, Ca, Cr, Fe, Ni, Cu, Pd, Pb and Au, the contents of the respective elements are determined by glow discharge mass spectrography, whose detection limit for Au is 0.1 ppmw and whose detection limit for each of the other eleven element is 0.01 ppmw.

As a result of a comparison of 6N—Ag with 4N—Ag, it was found that the content of Pd in 6N—Ag is less than 0.01 ppmw, while the content of Pd in 4N—Ag is as much as 2.3 ppmw. It is considered that the drastic reduction of Pd in 6N—Ag, as compared with that in 4N—Ag, greatly contributes to the surprisingly significant improvement in the quality of sound reproduction attained by using a cable made of 6N—Ag, rather than 4N—Ag.

Thus, it is advantageous that the high purity silver wire for use in recording, etc. according to the present invention is made of high purity silver with a purity of 99.9999% wt or more in terms of the above definition for 6N—Ag, said high purity silver being further characterized by containing less than 0.01 ppmw Pd.

The following examples are provided for the purpose of further illustrating the present invention, but are in no way to be taken as limiting the present invention.

Example 1

FIG. 1 is a vertical section showing schematically the apparatus for producing the high-purity silver of the present invention and reference will be made to this Figure in the following description.

First, 100 g of electrolytic silver with a purity of 99.99 wt % was charged into a feed crucible 5, which was fixed onto an aspiration table 9 installed in the center of a recovery mold 6. The assembly was then set up in an electric furnace 1 as shown in FIG. 1.

The feed crucible 5 and the recovery mold 6 were enclosed with an outer cylinder 3 and an inner cylinder 4, both of which were made of quartz. A vacuum pump 2 air causes the air within the inner cylinder 4 to be withdrawn through a hole (not shown) in the upper part of the aspiration table 9 until a vacuum was drawn into the inner cylinder 4.

After the feed crucible 5 was set up in the electric furnace 1, the vacuum pump 2 was operated to lower the pressure in the inner cylinder 4 down to 0.01 Pa. Upon a 5 minute purification at a furnace temperature of 1300° C., the silver in the feed evaporated and contacted the ceiling of the inner cylinder 4 over the feed crucible 5, whereupon it began condensing slowly to form particles, which dropped into the recovery mold 6 provided beneath the feed crucible 5.

Impurities in the feed that had higher vapor pressures than silver remained gaseous and were aspirated by means of the vacuum pump to pass through the holes in the upper part of the aspiration table and thereafter solidified on the cooling trap. Analysis showed that the solidified product was chiefly composed of substances of high vapor pressure such as sulfur, sodium, calcium and lead. The metal left in the feed crucible was also analyzed, revealing that it was chiefly composed of substances of low vapor pressure such as gold, copper, palladium and iron.

In the next step, the purified silver in the recovery mold 6 was drawn into a silver wire (11 mm$^\varnothing$) as it was cooled by passage through a withdrawing port (not shown) provided on a lateral side of the mold. The thus prepared raw material was hot- and cold- drawn under ordinary conditions into a thinner silver wire having a diameter of 1.5 mm. The silver wire was then analyzed for the concentration of impurities by means of a glow discharge mass spectrometer and the results are shown in Table 1.

The high-purity silver wire was further drawn to a diameter of 0.1 to 0.3 mm. A plurality of such wires were prepared, braided together and extrusion coated with a resin (PVC) insulator. Alternatively, individual wires were coated with the same insulator. Such wires were processed into speaker cords and audio pin cords, each of the latter being fitted with a plug on both ends; the cords were connected to a stereophonic system for sound reproduction.

For comparison, commercial 4N and 6N copper wires were processed into the same cords and connected to the stereophonic system. The sound reproduced with the high-purity silver wires of the present invention had very high levels of reverberation at high pitch, provided a very good sound field effect, offered very good localization and was characterized by salient tone colors.

TABLE 1

| | Impurity levels, ppmw | | | | | | | | | | | |
|---|---|---|---|---|---|---|---|---|---|---|---|---|
| | Na | Si | S | K | Ca | Cr | Fe | Ni | Cu | Pd | Au | Pb |
| Example 1 | <0.01 | <0.01 | 0.05 | <0.01 | <0.01 | <0.01 | 0.04 | <0.01 | 0.01 | <0.01 | <0.1 | <0.01 |

The high-purity silver wires of the invention were also compared with the conventional products in terms of image quality. The results are shown in Table 2 hereinbelow; very sharp images were produced with the wires of the present invention.

TABLE 2

| | Image Sharpness | Acoustic Quality |
|---|---|---|
| Invention Ag wire | Very sharp | Very high reverberation of treble level and good woofing of base level |
| 4N Cu wire | Less sharp | Acceptable |
| 6N Cu wire | Moderate | Very high reverberation of treble level |

As described above, the present invention for the first time succeeded in establishing a practically feasible process for the production of very high-purity silver (>99.9999 wt %) and the high-purity silver wire of the present invention can be easily prepared by drawing the very-high purity silver produced by that process. Using the thus prepared silver wire, further improvements in acoustic and image characteristics can be realized.

In the above Example 1, a 4N—Cu wire and a 6N—Cu wire were shown as examples of prior art wires. A 4N—Ag wire existed as a prior art wire, but a 6N—Ag wire did not exist at the time of filing the parent application. Although the 4N—Ag wire was commercially available then, it was not considered that the 4N—Ag wire was better than the 4N—Cu wire and the 6N—Cu wire. Instead, it was well known among music fanatics that the 4N—Ag wire had a certain defect which was commonly called "stink of silver" or "silverish sound". The meaning of the so-called "stink of silver" defect is as follows. When the 4N—Ag wire was used in an audio instrument etc., there was a strange undulation or a swell in sound at the treble level. In particular, the sound swelled like "a heave with sobs" or like "a convulsive sob" at the treble level of the sound, or it was often the case that music became strangely squeezed like an extremely narrow line.

It is considered that the above discussed "stink of silver" of the 4N silver wire may have been due to the unsatisfactory degree of purity of silver, which perhaps could have been overcome by further enhancing the purity of silver. Considering the fact, however, that 4N copper wire is free from such "stink of silver" defect, the "stink of silver" defect was considered to possibly be inherent to silver itself. If so, it was not certain whether the "stink of silver" defect could have been avoided by simply enhancing the purity of silver.

In addition, heretofore, the enhancement of the purity of silver to the level of 99.9999% or more was itself a big problem. The methods for obtaining high purity metals heretofore known to the public were limited to the "repeated electrolytic refining" and the "zone melting" technique. In any case, even if a 6N—Ag cable wire can be successfully produced by one of such prior art techniques, it would not have been desirable from an economic viewpoint because it would have cost more than ten times as much as a 4N—Ag cable. Accordingly, if music fanatics having a highly trained music ear would not appreciate the value of the product, they would not have purchased the product.

The so-called "stink of silver" defect has been completely overcome by the present invention.

The inventors started their investigation with the analysis of 4N—Ag produced by the electrolytic refining method and analyzed by the GDMS.

The results of the quantitative analysis with respect to the predetermined twelve impurities by GDMS, with the detection limit for Au being set at 0.1 ppmw and the detection limit of the remaining eleven impurities being set at 0.01 ppmw are as given in the following Table 3.

TABLE 3

| | | | | Impurity levels, ppmw | | | | | | | |
|---|---|---|---|---|---|---|---|---|---|---|---|
| Na | Si | S | K | Ca | Cr | Fe | Ni | Cu | Pd | Au | Pb |
| 0.08 | 0.01 | 0.35 | <0.01 | <0.01 | 0.02 | 2.3 | 0.04 | 0.67 | 2.3 | 4.1 | 0.23 |

The above analytical results show that among the impurities contained in the 4N—Ag, the contents of Pd and Au are substantially high. To obtain 6N—Ag it is necessary to reduce the total amount of Pd and Au to the level of less than 1 ppmw.

There were two conceivable methods which would enable the enhancement of the purity of 4N—Ag to the level of 6N—Ag. One method was the electrolytic refining method, and the other method was the zone melting method. It turned out that it was theoretically impossible to further reduce the contents of Pd and Au contained in the 4N—Ag by the electrolytic refining method. The inventors then considered that to enhance the purity of 4N—Ag to the level of 6N—Ag by the zone melting method, it would be necessary to repeat the zone refining at least several times.

Thereupon, the present inventors made a great effort to develop a novel method for highly refining the 4N—Ag to the level of 6N—Ag and finally attained the refining method of the present invention.

Example 2

Another example of an analysis of the twelve impurities of 6N—Ag obtained by the method described in Example 1 is given below in Table 4.

TABLE 4

| Impurity Levels of 6N—Ag Prepared by the Method of the Present Invention, ppmw | | | | | | | | | | | |
|---|---|---|---|---|---|---|---|---|---|---|---|
| Na | Si | S | K | Ca | Cr | Fe | Ni | Cu | Pd | Au | Pb |
| <0.01 | 0.01 | 0.16 | <0.01 | <0.01 | <0.01 | 0.14 | <0.01 | 0.04 | <0.01 | <0.1 | <0.01 |

As shown in the above Table 4, the amount of each of Pd and Au is less than the detection limit for the respective elements (<0.01 ppmw Pd; <0.1 ppmw Au) with respect to the refined product obtained by the method of the present invention.

When the 6N—Ag was used as an audio cable, etc. the so-called "a stink of silver" defect was completely eliminated. Furthermore, as a result of using the 6N—Ag as an audio cable, etc, surprisingly improved sound reproduction was realized.

It will be appreciated that the instant specification is set forth by way of illustration and not limitation, and that various modifications and changes may be made without departing from the spirit and scope of the present invention.

What is claimed is:

1. A high purity silver wire for use in recording, acoustic or image transmission applications, said high purity silver wire consisting of high purity silver containing sulfur, iron, copper, palladium, gold and lead in amounts such that no one of said sulfur, iron, copper, palladium, gold and lead impurities individually exceeds 0.5 ppmw and wherein all other impurities are present in a total amount of less than 1 ppmw.

2. The high purity silver wire for use in recording, acoustic or image transmission applications according to claim 1, said high purity silver having a silver purity of at least 99.9999 wt % with a total impurity content of less than 1 ppmw as measured by glow discharge mass spectrometric analysis.

3. A high purity silver wire for use in recording, acoustic or image transmission applications, said high purity silver wire having been produced by drawing high purity silver having a silver purity of at least 99.9999 wt % and having a total impurity content of less than 1 ppmw as measured by glow discharge mass spectrometric analysis, said high purity silver having been produced by introducing silver containing impurities into a vacuum distillation refiner that comprises an electric furnace, a feed crucible disposed in the electric furnace for receiving the silver containing impurities, an inner cylinder enclosing the feed crucible and an outer cylinder enclosing the inner cylinder, wherein air contained therein can be evacuated with a vacuum pump, the feed crucible being fixed onto an aspiration table provided in the center of a recovery mold, and a cooling trap and a water-cooled flange are detachably connected to the furnace.

4. The high purity silver wire for use in recording, acoustic or image transmission applications according to claim 1, wherein the other impurities comprise at least one element selected from the group consisting of sodium, silicon, potassium, calcium, chromium and nickel.

5. The high purity silver wire for use in recording, acoustic or image transmission applications according to claim 4, wherein the impurities comprising said at least one element are present in an amount of 0.1 ppmw and below, based on glow discharge mass spectrography.

6. The high purity silver wire for use in recording, acoustic or image transmission applications according to claim 4, wherein said high purity silver wire has the following composition: <0.01 ppmw Na, <0.01 ppmw Si, 0.05 ppmw S, <0.01 ppmw K, <0.01 ppmw Ca, <0.01 ppmw Cr, 0.04 ppmw Fe, <0.01 ppmw Ni, 0.01 ppmw Cu, <0.01 ppmw Pd, <0.1 ppmw Au, <0.01 ppmw Pb and the remainder being silver.

7. The high purity silver wire for use in recording, acoustic or image transmission applications according to claim 4, wherein said high purity silver wire has the following composition: <0.01 ppmw Na, <0.01 ppmw Si, 0.16 ppmw S, <0.01 ppmw K, <0.01 ppmw Ca, <0.01 ppmw Cr, 0.14 ppmw Fe, <0.01 ppmw Ni, 0.04 ppmw Cu, <0.01 ppmw Pd, <0.1 ppmw Au, <0.01 ppmw Pb and the remainder being silver.

8. A high purity silver wire for use in recording, acoustic or image transmission applications, said high purity silver wire consisting of silver having a purity of not less than 99.9999 wt % and impurities containing at least one element selected from the group consisting of Na, Si, S, K, Ca, Cr, Fe, Ni, Cu, Pd, Pb and Au, such that no one of S, Fe, Cu, Pd, Au and Pb impurities individually exceeds 0.5 ppmw based on glow discharge mass spectrography, and such that Na, Si, K, Ca, Cr and Ni each have detection limits based on glow discharge mass spectrography of 0.1 ppmw and below, and the total amount of impurities is less than 1 ppmw.

* * * * *